Patented Dec. 21, 1926.

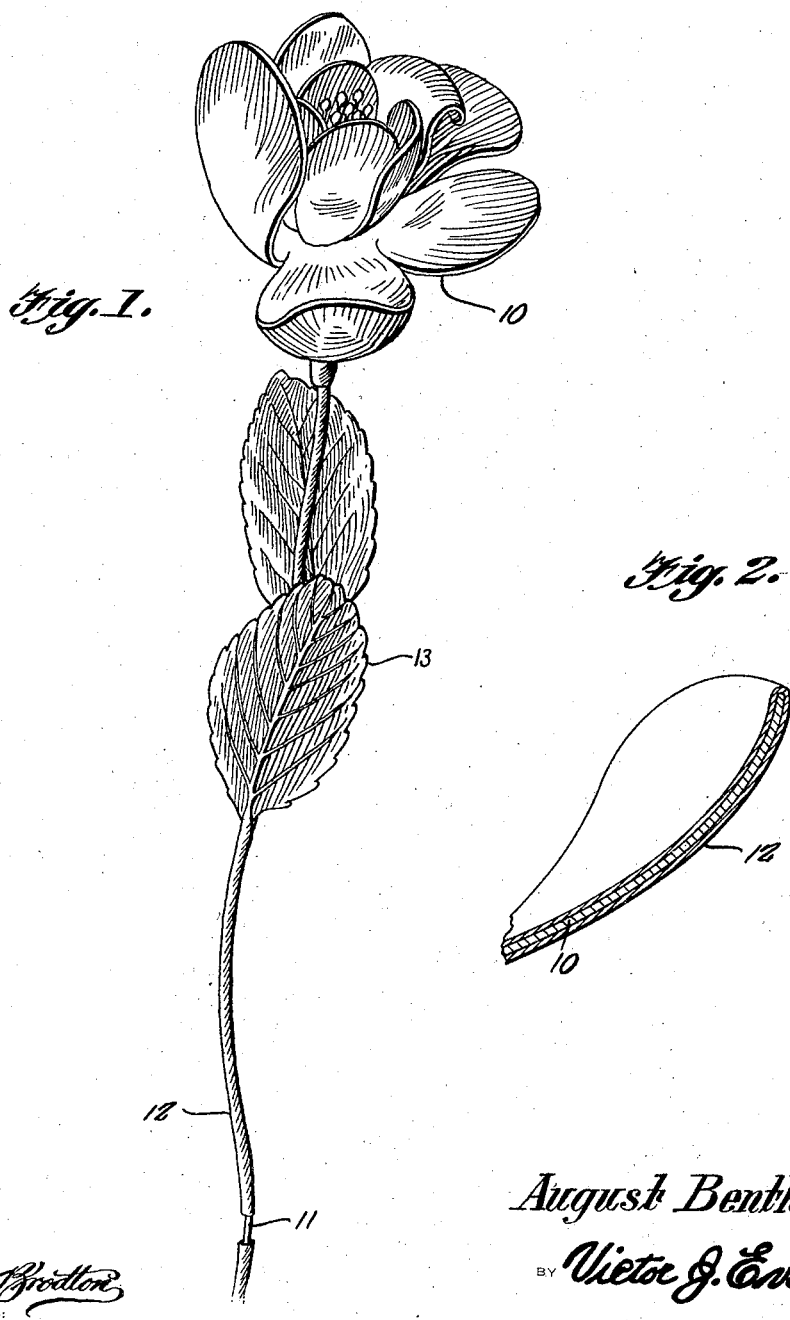

1,611,713

UNITED STATES PATENT OFFICE.

AUGUST BENTKAMP, OF NEW YORK, N. Y.

PROCESS OF MANUFACTURING ARTIFICIAL FLOWERS.

Application filed July 14, 1926. Serial No. 122,431.

This invention relates to improvements in the process of manufacturing artificial flowers for decorative purposes.

The primary object of the invention resides in the construction of an artificial flower which is glossy in appearance to give the same a high lustre and to impart a realistic appearance to the flower.

Another object of the invention is to provide an artificial flower which may be dusted or wiped off without fear of cracking the same, as is the case of the present waxed flowers, and which is waterproof to permit of the washing of the same if necessary, and the preservation of the flower in damp and hot places.

A further object of the invention aims to provide a process for manufacturing artificial flowers which is simple, inexpensive and which produces an article capable of long use.

In the accompanying drawing:—

Figure 1 is a perspective view of artificial flower constructed in accordance with my improved process.

Figure 2 is an enlarged detail vertical sectional view through a portion of the flower.

In practice, the bloom and leaves of the flower to be formed are constructed from a flat blank of non-porous fabric material, such as glazed cotton fabric 10, which fabric is well-known for various purposes but to my knowledge, the same has never before been used as a base for the manufacture of artificial flowers. The fabric is cut to the desired shape depending of course, on the type of the flower to be constructed and is then placed in a mold and pressed to impart to the fabric the characteristics of the desired flower. The shaped fabric base is then attached to one end of a wire stem 11 in the usual manner, and the same dipped in either a plain or colored solution of alcohol-varnish so that the fabric bloom is fully immersed therein, after which the same is withdrawn and hung up for drying purposes. Various colors may be mixed with the alcohol varnish, depending upon the color of the flower to be formed. In subjecting the flower to the alcohol varnish solution, an operator grasps the stem and manually dips the bloom into the solution, so that the entire surface of the bloom is covered with an outer coating 12.

When coated with the solution and after drying, the bloom possesses a glossy finish somewhat resembling porcelain and provides a protecting outer surface for the base 10, from which the flower is formed. The solution serves to stiffen the fabric base but not to such an extent as to crack when crushed. The flower may be flexed without cracking and is rendered waterproof by the outer coating 12. If desired, the bloom may be sprayed with various colored solutions of alcohol-varnish after the dipping operation to provide a tint to the petals of the flower to give the same a more realistic appearance.

The leaves 13 are treated in a manner similar to the process just described and may be attached to the stem by the usual winding of a covering of material about the stem 11.

From the foregoing description, it will be seen that I have conceived a new process for manufacturing artificial flowers, which flowers may be dusted without fear of cracking and which are waterproof to withstand a washing operation should the same become necessary.

What is claimed as new is:—

1. The process of manufacturing artificial flowers which consists of cutting the flower from a blank of non-porous fabric, pressing the cut fabric to the desired shape, and immersing the shaped flower in a solution of alcohol varnish.

2. The process of manufacturing artificial flowers which consists of providing a base of non-porous fabric, pressing the base to the desired shape, and applying a coating of waterproof material to said base.

3. The process of manufacturing artificial flowers which consists of cutting the flower from a blank of non-porous fabric, pressing the cut fabric to the desired shape, and immersing the shaped flower in a colored solution of alcohol varnish and hanging the flower to dry whereby to impart a glossy finish to the flower.

4. The process of manufacturing artificial flowers which consists of providing a base of non-porous fabric, pressing the base to the desired shape, and applying a coating of waterproof material to said base, and spraying the coating with a colored solution to apply a tint to the flower.

In testimony whereof I have affixed my signature.

AUGUST BENTKAMP.